US009992207B2

(12) United States Patent
Tartz et al.

(10) Patent No.: US 9,992,207 B2
(45) Date of Patent: Jun. 5, 2018

(54) SCALABLE AUTHENTICATION PROCESS SELECTION BASED UPON SENSOR INPUTS

(71) Applicant: QUALCOMM Incorporated, San Diego, CA (US)

(72) Inventors: Robert Tartz, San Marcos, CA (US); Qazi Bashir, San Marcos, CA (US); Jonathan Kies, Encinitas, CA (US); Suzana Arellano, San Diego, CA (US); Virginia Keating, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 14/494,543

(22) Filed: Sep. 23, 2014

(65) Prior Publication Data

US 2016/0087952 A1    Mar. 24, 2016

(51) Int. Cl.
| | |
|---|---|
| H04M 1/66 | (2006.01) |
| H04L 29/06 | (2006.01) |
| H04W 12/06 | (2009.01) |
| G06F 21/32 | (2013.01) |
| G06F 21/35 | (2013.01) |
| G06F 21/40 | (2013.01) |
| G06F 21/57 | (2013.01) |
| H04W 88/02 | (2009.01) |

(52) U.S. Cl.
CPC ............ *H04L 63/105* (2013.01); *G06F 21/32* (2013.01); *G06F 21/35* (2013.01); *G06F 21/40* (2013.01); *G06F 21/577* (2013.01); *H04W 12/06* (2013.01); *H04L 63/0861* (2013.01); *H04L 2463/082* (2013.01); *H04W 88/02* (2013.01)

(58) Field of Classification Search
CPC ............................. H04W 88/02; H04W 12/06
USPC ........................ 455/411, 410, 435.1
See application file for complete search history.

(56) References Cited

U.S. PATENT DOCUMENTS

| | | | |
|---|---|---|---|
| 8,555,340 B2 | 10/2013 | Potter et al. | |
| 8,572,391 B2 | 10/2013 | Golan et al. | |
| 2003/0033524 A1 | 2/2003 | Tran et al. | |
| 2003/0115142 A1 | 6/2003 | Brickell et al. | |
| 2013/0174239 A1 | 7/2013 | Kim et al. | |
| 2013/0267204 A1 | 10/2013 | Schultz et al. | |
| 2014/0157401 A1* | 6/2014 | Alameh | G06F 21/45 726/17 |

(Continued)

FOREIGN PATENT DOCUMENTS

EP    2743873 A1    6/2014

OTHER PUBLICATIONS

International Search Report and Written Opinion—PCT/US2015/047578—ISA/EPO—dated Nov. 16, 2015.

*Primary Examiner* — Chuck Huynh
(74) *Attorney, Agent, or Firm* — Jae-Hee Choi; Hunter Clark PLLC (57) ABSTRACT

Disclosed is a mobile device that selects an authentication process based upon sensor inputs and mobile device capabilities. The mobile device may include: a plurality of sensors; and a processor. The processor may be configured to: determine multiple authentication processes based upon sensor inputs and mobile device capabilities for authentication with at least one of an application or a service provider; select an authentication process from the multiple authentication processes that satisfies a security requirement; and execute the authentication process.

16 Claims, 5 Drawing Sheets

(56) References Cited

U.S. PATENT DOCUMENTS

2014/0208419 A1\* 7/2014 Chang .................... G06F 21/31
726/21

\* cited by examiner

RISK INDEX

| APP/SERVICE/DEV LOGIN | TRANSACTION $ AMOUNT | LOCATION (GPS, WiFi) | USER SPENDING BEHAVIOR DEVIATION | CROWD SOURCED DATA | DEMOGRAPHIC PROFILE |
|---|---|---|---|---|---|
| LOW (E.G., PHOTOS, GAMES) | LOW (E.G., < $100) | NEAR HOME/WORK (<5 Mi.) OR REGION TAGGED LOW RISK | CONSISTENT WITH PAST DATA | LOST OF CONFIRMED DATA (LOW) | LOW RISK |
| MEDIUM (E.G., SOCIAL NETWORK) | MEDIUM (E.G., $100-$1000) | IN TOWN (5-100 Mi.) OR REGION TAGGED MEDIUM RISK | MOSTLY CONSISTENT WITH PAST DATA | SOME CONFIRMED DATA (MED) | MEDIUM RISK |
| HIGH (E.G., BANK, SECURITY SETTINGS) | HIGH (E.G., > $1000) | FAR AWAY (> 100 Mi.) OR REGION TAGGED HIGH RISK | INCONSISTENT WITH PAST DATA | NO CONFIRMED DATA (HIGH) | HIGH RISK |

TRUST INDEX

400 →

| AUTHENTICATION PROCESS (BIOMETRICS) | TRUST LEVEL |
|---|---|
| 402 — SOFT BIOMETRICS (E.G. HAIR COLOR)<br>FINGER/HAND GEOMETRY<br>ECG SCAN | LOW (1-3) |
| 404 — VOICE SCAN<br>FACIAL SCAN<br>PASSWORD | MEDIUM (4-7) |
| 406 — FINGERPRINT SCAN<br>IRIS SCAN | HIGH (8-10) |

SCALABLE AUTHENTICATION PROCESS SELECTION BASED UPON SENSOR INPUTS

BACKGROUND

Field

The present invention relates to a mobile device that selects an authentication process based upon sensor inputs.

Relevant Background

User authentication is typically required when accessing service providers, websites, networks, applications, devices, etc. A commonly deployed authentication method is to use a password, but various biometric authentication methods are becoming more popular. Although biometric authentication methods are convenient since there is nothing to lose or remember, in order for them to be highly secure, increased user effort is required and many false rejections during authentication attempts are common Increased user effort translates into increased attention to authentication behavior in order to successfully authenticate using biometric methods (e.g., for an iris scan—holding the device the right way, the right distance, for the right time, in the right lighting, with the proper head pose, with the proper eye position) and/or multiple authentication attempts are required in order to successfully authenticate.

However, in many instances users may be only mildly concerned with security (e.g., accessing gaming stats or viewing photos), while in other instances security is more important (e.g., purchasing something online or accessing email), and in some instances security is critical (e.g., accessing a bank account or access control to house/car). Currently, each of these scenarios often requires the user to authenticate using the same biometric methods, requiring undue user attention and effort, which can cause annoyance in scenarios where security is not that important (e.g., in the first instance), whereas in more important security critical scenarios (e.g., in the last instance) the same biometric method is not sufficient enough.

SUMMARY

Aspects of the invention relate to a mobile device that selects an authentication process based upon sensor inputs. The mobile device may include: a plurality of sensors; and a processor. The processor may be configured to: determine multiple authentication processes based upon sensor inputs and mobile device capabilities for authentication with at least one of an application or a service provider; select an authentication process from the multiple authentication processes that satisfies a security requirement; and execute the authentication process.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the term "mobile device" refers to any form of programmable computer device including but not limited to laptop computers, tablets, smartphones, televisions, desktop computers, home appliances, cellular telephones, personal television devices, personal data assistants (PDA's), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, or any computing device or data processing apparatus.

Figure 1:
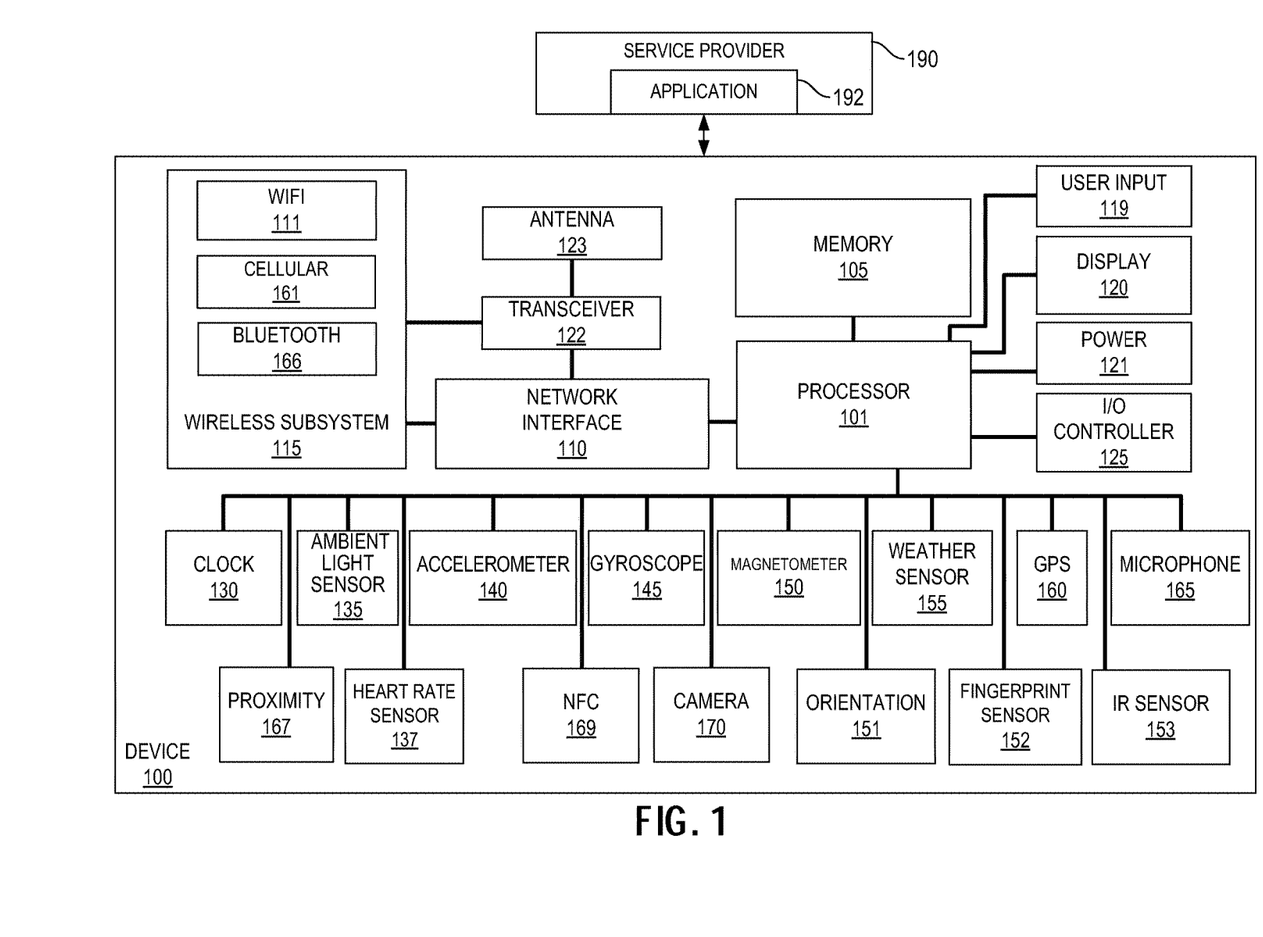
FIG. 1 is a diagram of a device in which aspects of the invention may be practiced.

FIG. 1 is block diagram illustrating an exemplary device in which embodiments of the invention may be practiced. The system may be a computing device (e.g., a mobile device 100), which may include one or more processors 101, a memory 105, I/O controller 125, and network interface 110. Mobile device 100 may also include a number of sensors coupled to one or more buses or signal lines further coupled to the processor 101. It should be appreciated that mobile device 100 may also include a display 120 (e.g., a touch screen display), a user interface 119 (e.g., keyboard, touch screen, or similar devices), a power device 121 (e.g., a battery), as well as other components typically associated with electronic devices. In some embodiments, mobile device 100 may be a transportable device, however, it should be appreciated that device 100 may be any type of computing device that is mobile or non-mobile (e.g., fixed at a particular location).

Mobile device 100 may include sensors such as: a clock 130, ambient light sensor (ALS) 135, heart rate sensor 137, accelerometer 140, gyroscope 145, magnetometer 150, orientation sensor 151, fingerprint sensor 152, weather sensor 155 (e.g., temperature, wind, humidity, barometric pressure, etc.), Global Positioning Sensor (GPS) 160, infrared (IR) sensor 153, proximity sensor 167, and near field communication (NFC) sensor 169. Further, sensors/devices may include a microphone (e.g. voice sensor) 165 and camera 170. Communication components may include a wireless subsystem 115 (Bluetooth 166, Wi-Fi 111, cellular 161), which may also be considered sensors, that are used to analyze the environment (e.g., position) of the device. In some embodiments, multiple cameras are integrated or accessible to the device. For example, a mobile device may have at least a front and rear mounted camera. In some embodiments, other sensors may also have multiple installations or versions.

Memory 105 may be coupled to processor 101 to store instructions for execution by processor 101. In some embodiments, memory 105 is non-transitory. Memory 105 may also store one or more models, modules, engines to implement embodiments described below that are implemented by processor 101. Memory 105 may also store data from integrated or external sensors.

Mobile device 100 may include one or more antenna(s) 123 and a transceiver 122. The transceiver 122 may be configured to communicate bidirectionally, via the antenna (s) and/or one or more wired or wireless links, with one or more networks, in cooperation with network interface 110 and wireless subsystems 115. Network interface 110 may be coupled to a number of wireless subsystems 115 (e.g., Bluetooth 166, Wi-Fi 111, Cellular 161, or other networks) to transmit and receive data streams through a wireless link to/from a wireless network, or may be a wired interface for direct connection to networks (e.g., the Internet, Ethernet, or other wireless systems). Mobile device 100 may include one or more local area network transceivers connected to one or more antennas. The local area network transceiver comprises suitable devices, hardware, and/or software for communicating with and/or detecting signals to/from WAPs, and/or directly with other wireless devices within a network. In one aspect, the local area network transceiver may comprise a Wi-Fi (802.11x) communication system suitable for communicating with one or more wireless access points.

Mobile device 100 may also include one or more wide area network transceiver(s) that may be connected to one or more antennas. The wide area network transceiver comprises suitable devices, hardware, and/or software for communicating with and/or detecting signals to/from other wireless devices within a network. In one aspect, the wide area network transceiver may comprise a CDMA communication system suitable for communicating with a CDMA network of wireless base stations; however in other aspects, the wireless communication system may comprise another type of cellular telephony network or femtocells, such as, for example, TDMA, LTE, Advanced LTE, WCDMA, UMTS, 4G, or GSM. Additionally, any other type of wireless networking technologies may be used, for example, WiMax (802.16), Ultra Wide Band, ZigBee, wireless USB, etc. In conventional digital cellular networks, position location capability can be provided by various time and/or phase measurement techniques. For example, in CDMA networks, one position determination approach used is Advanced Forward Link Trilateration (AFLT).

Thus, device 100 may be a: mobile device, wireless device, cellular phone, personal digital assistant, mobile computer, wearable device (e.g., head mounted display, wrist watch, virtual reality glasses, etc.), car, home monitoring device, internet appliance, gaming console, digital video recorder, e-reader, robot navigation system, tablet, personal computer, laptop computer, or any type of device that has processing capabilities. As used herein, a mobile device may be any portable, or movable device or machine that is configurable to acquire wireless signals transmitted from, and transmit wireless signals to, one or more wireless communication devices or networks. Thus, by way of example but not limitation, mobile device 100 may include a radio device, a cellular telephone device, a computing device, a personal communication system device, or other like movable wireless communication equipped device, appliance, or machine. The term "mobile device" is also intended to include devices which communicate with a personal navigation device, such as by short-range wireless, infrared, wire line connection, or other connection—regardless of whether satellite signal reception, assistance data reception, and/or position-related processing occurs at the device 100. Also, "mobile device" is intended to include all devices, including wireless communication devices, computers, laptops, etc., which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

It should be appreciated that embodiments of the invention as will be hereinafter described may be implemented through the execution of instructions, for example as stored in the memory 105 or other element, by processor 101 of mobile device 100 and/or other circuitry of device and/or other devices. Particularly, circuitry of the device, including but not limited to processor 101, may operate under the control of a program, routine, or the execution of instructions to execute methods or processes in accordance with embodiments of the invention. For example, such a program may be implemented in firmware or software (e.g. stored in memory 105 and/or other locations) and may be implemented by processors, such as processor 101, and/or other circuitry of device. Further, it should be appreciated that the terms processor, microprocessor, circuitry, controller, etc., may refer to any type of logic or circuitry capable of executing logic, commands, instructions, software, firmware, functionality and the like. The functions of each unit or module within the mobile device 100 may also be implemented, in whole or in part, with instructions embodied in a memory, formatted to be executed by one or more general or application-specific processors.

Embodiments of the invention may relate to an apparatus and method for the dynamic selection and scaling of multiple authentication processes based upon various sensor inputs and device capabilities to meet the dynamic security requirements of a service provider, application, or device, using various contextual inputs. In particular, as will be described hereinafter, mobile device 100, under the control of processor 101, may select an authentication process from a multitude of different authentication processes to meet the dynamic security requirements of a service provider, application, or device, using various contextual inputs.

Various terminologies will be described to aid in the understanding of aspects of the invention. Sensor inputs may refer to any input from any of the previously described sensors, e.g.: clock 130, ambient light sensor (ALS) 135, heart rate sensor 137, accelerometer 140, gyroscope 145, magnetometer 150, orientation sensor 151, fingerprint sensor 152, weather sensor 155 (e.g., temperature, wind, humidity, barometric pressure, etc.), Global Positioning Sensor (GPS) 160, infrared (IR) sensor 153, microphone 165 (e.g., for voice input), proximity sensor 167, near field communication (NFC) sensor 169, camera 170. In particular, some of the sensor inputs may be referred to as biometric sensor inputs from biometric sensors, which may include: heart rate sensor 137, fingerprint sensor 152 (e.g., fingerprint input), touch-screen 120 (e.g., hand geometry), pressure sensors (hand geometry), microphone 165 (e.g., voice scan), camera 170 (facial scan), camera 170 (iris or sclera scan), etc. It should be appreciated these are just example of biometric sensor inputs and biometric sensors and that a wide variety of additional sensor inputs may be utilized.

Further, contextual information or contextual inputs may refer to the current environment that the mobile device 100 is currently in. Therefore, a contextual sensor may be considered to be any type of sensor that relates to the current context situation of the mobile device which may relate to such contextual sensing information as: light; acceleration; velocity; weather; orientation; location, proximity, sound, etc. Accordingly, examples of contextual sensors may include: ambient light sensor 135; accelerometer 140; weather sensor 155; orientation sensor 151; GPS 160, proximity sensor 167; microphone 165, etc. These merely being examples of context inputs and contextual sensors. Also, contextual inputs may also be characterized as data collected about the end user, such as: transaction amounts during purchases, user spending data, crowd source data, demographic data, websites visited, emails; phone calls made, files opened, networks used, applications used, etc., as will be described in more detail hereinafter.

In one embodiment, mobile device 100 selects an authentication process from multiple different authentication processes based upon sensor inputs, contextual inputs, and mobile device capabilities. In particular, mobile device 100 may include a plurality of sensors (as previously described) and a processor 101. The processor 101 may be configured to: determine multiple authentication processes based upon contextual inputs, sensor inputs, and the capabilities of the mobile device 100 for authentication with at least one of a service provider 190 or an application 192, or a device. Further, processor 101 may be configured to: select an authentication process from the multiple authentication processes that satisfies a security requirement; and execute the authentication process. It should be appreciated that the service provider 190 that operates an application 192 may be a website (e.g., a bank website, a medical website, a store website, a social media website, etc.), a private/public network, or any type of computing device that provides data/service that may be connected to via a link. For example, mobile device 100 may connect to the service provider 190 via a wireless link (e.g., cellular, Wi-Fi, or other networks, etc.) or a wired link. Also, it should be appreciated that the application 192 may be on the mobile device 100 itself. Additionally, it should be appreciated that mobile device capabilities may refer to the capabilities of the wireless device 100 itself, such as, whether or not it includes particular sensors such as: clock 130, ambient light sensor (ALS) 135, heart rate sensor 137, accelerometer 140, gyroscope 145, magnetometer 150, orientation sensor 151, fingerprint sensor 152, weather sensor 155, Global Positioning Sensor (GPS) 160, infrared (IR) sensor 153, microphone 165, proximity sensor 167, near field communication (NFC) sensor 169, camera 170, etc. Mobile device capabilities may also include the type of processor, memory, speed, and the accuracy of the sensors themselves.

In one embodiment, the contextual inputs may be inputs from a contextual sensor and/or may include at least one of current user input data, previous user input data, location, time, or demographic data. As previously described, a contextual sensor may be considered to be any type of sensor that relates to the current context situation of the mobile device which may relate to such sensing information as: light; acceleration; weather; orientation; location, proximity, sound, etc. Accordingly, examples of contextual sensors may include: ambient light sensor 135; accelerometer 140; weather sensor 155; orientation sensor 151; GPS 160, proximity sensor 167; microphone 165, etc. Further, the sensor inputs include biometric sensor inputs from biometric sensors. For example, as previously described, biometric sensors for biometric sensor inputs may include: heart rate sensor 137, fingerprint sensor 152 (e.g., fingerprint input), touch-screen 120 (e.g., hand geometry), pressure sensors (hand geometry), microphone 165 (e.g., voice scan), camera 170 (facial scan), camera 170 (iris or scerla scan), etc. It should be appreciated that a wide variety of different types of sensors may be utilized and that these are merely examples. Also, particular types of sensors may be utilized, such as a capacitive touch-screen for hand geometry. However, again, these are merely examples.

Figure 2:
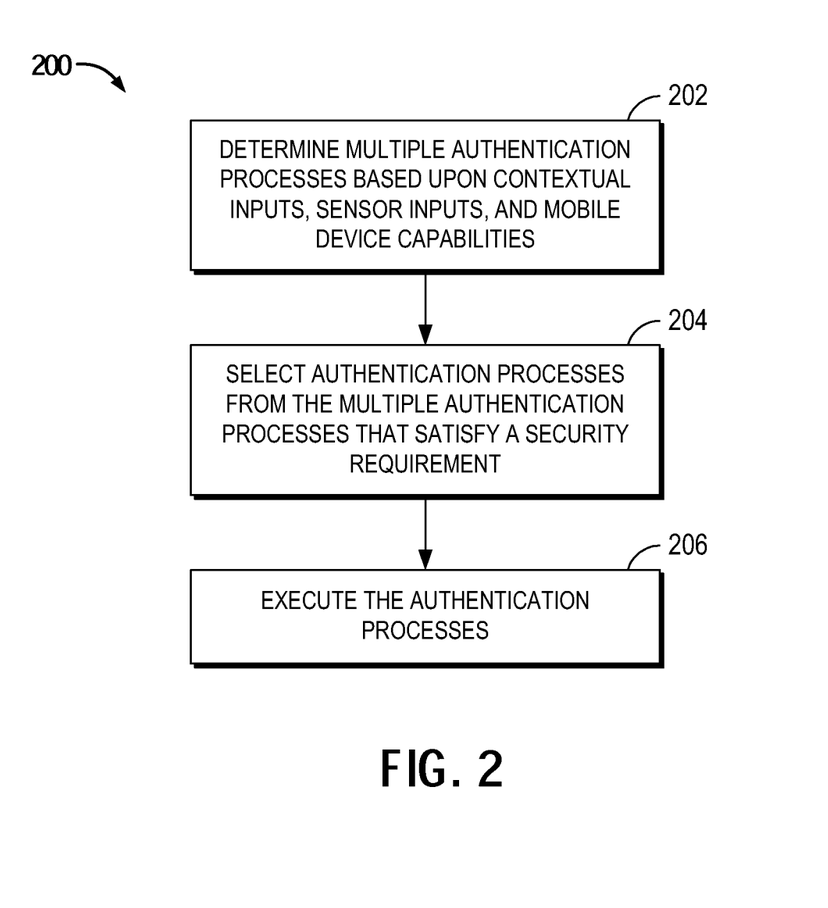
FIG. 2 is flow diagram illustrating a process to select an authentication process.

Further, as will be described in more detail hereinafter, processor 101 may be further configured to determine a risk index based upon the contextual inputs and to determine a trust index based upon the sensor inputs. The security requirement may be determined to be satisfied if the trust index is greater than the risk index. In this way, an authentication process that satisfies the security requirement is selected from the plurality of multiple authentication processes and the authentication process is executed to allow the mobile device 101 to be authenticated to a service provider 190 and/or application 192 and/or a device. With brief additional reference to FIG. 2, mobile device 100 may implement a process 200 to: determine multiple authentication processes based upon contextual inputs, sensor inputs, and the capabilities of the mobile device 100 for authentication with at least one of a service provider 190 or an application 192 (block 202); select an authentication process from the multiple authentication processes that satisfies a security requirement (block 204); and execute the authentication process (block 206).

As one example, mobile device 100 under control of processor 101 may connect to service provider 190 to perform a function, such as: to complete a purchase transaction (e.g., service provider 190 is a store website) or to transfer money (e.g., service provider 190 is a bank website). Further, mobile device 101 under control of processor 101 may attempt to login to an application 192 or a device. In either of these scenarios, an authentication process may be required and a Risk Level may be calculated for use in the authentication process.

Utilizing the bank transaction (e.g., service provider 190 is a bank website), as the example, the transfer amount, location of the user, and other contextual inputs may be used to calculate a Risk Index using pre-assigned Risk Levels. An example of Risk Indexes 300 may be seen with reference to FIG. 3. In this example, service 302 has a High Risk Rating 302. Also, as examples, the transaction amount 304 (e.g., >$1000.00) and the location 310 (e.g., Far Away) may indicate high risks. A Trust Index may be calculated based on the level of trust associated with each of the biometric authentication strategies registered with the mobile device 100. An example of Trust Indexes 400 may be seen with reference to FIG. 4. Processor 101 of mobile device 100 may select biometric authentication processes (e.g., fingerprint sensor) 406 such that the Trust Index is high and greater than the Risk Index, so that the security requirement is satisfied in order to successfully authenticate and complete the transaction with the service provider 190. Based upon this calculation to satisfy the security requirement, this biometric authentication process (e.g., fingerprint sensor) 406 is selected from multiple other authentication processes and this authentication process may be executed to authenticate the mobile device 101 to the service provider 190.

In this way, convenience to the user is dynamically maximized when authenticating. Further, selecting and scaling the authentication processes to meet the security needs of the current service provider 190/application 192/device requires the least amount of security necessary to successfully authenticate, thereby minimizing increased user effort. It should be appreciated that there are a multitude of possible use cases such as: bank transactions (e.g., mobile payments, mobile purchases, money transfers); log-in information; and access. Examples of access include access to: a device (e.g., a phone); an application; an online service; an online network; social network; email; mobile cloud storage; mobile banking services; etc. It should be appreciated this process may be utilized to authenticate the mobile device to any type of server, website, application, device, etc.

As an example, when a function is to be performed by the mobile device 100 (e.g., a financial transaction through a service provider 190, application 192 login, device login) in which an authentication process needs to be performed, the mobile device 100 may determine multiple authentication processes based upon contextual inputs and sensor inputs. In particular, with additional reference to FIG. 3, which shows a table 300 of Risk Indexes, in order to generate the security requirement, contextual inputs may be utilized to calculate a Risk Index using the level of risk associated with each of the following contextual input parameters: Application/Service Provider/Device Login 302—this includes Low (e.g., games), Medium (e.g., social network), High (e.g., bank transaction); Transaction Dollar Amount 304 (e.g., Low less than $100.00, Medium less than $1000.00, or High greater than $1000.00); Location (GPS, WiFi determined) 310—this includes Low (e.g., near home/work), Medium (e.g., in town/region), High (e.g., far away); User Spending Behavior Deviation 312 from learned spending behavior patterns—Low (e.g., consistent with past data), Medium (e.g., mostly consistent with past data), High (e.g., inconsistent with past data); Crowd sourced data collected during an event 314—Low (e.g., lots of confirmed), Medium (e.g., some confirmed data), High (e.g., no confirmed data); and Demographic profile 316—Low risk, Medium risk, High risk.

Figure 3:
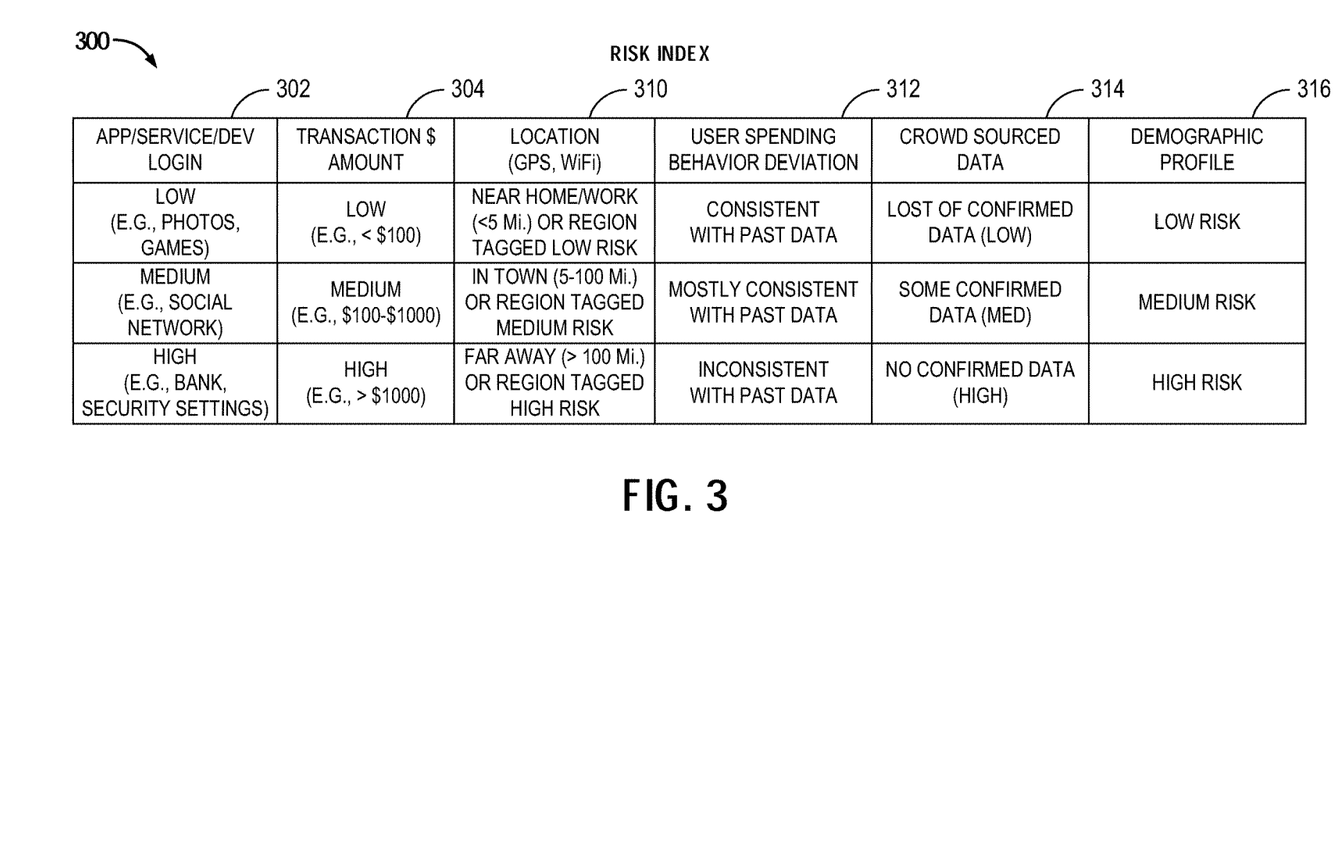
FIG. 3 is a table illustrating Risk Indexes.

As examples, for Application/Service Provider/Device Login 302, the user could be attempting to access (login to) an application, service provider or device that requires authentication. For example, a gaming application may have lower security requirements (low risk index), while a banking service could have higher security requirements (high risk index). Evolving security requirements could also be supported using this method (e.g., security requirements for a photo sharing service increases due to new policies). As another example, a user could be attempting to complete an online transaction of some dollar amount each of which may have particular risks, e.g., Transaction Dollar Amount 304 (e.g., Low risk less than $100.00, Medium risk less than $1000.00, or High risk greater than $1000.00). As another example of contextual input for use in meeting the security requirements, location determined by a location sensor may be utilized as a Risk Index. The Risk Index may be Low for users accessing a service or transaction in or near common everyday locations, such as home, work or a relative's home, while High risk may be associated with public settings, especially if far from a common location (e.g., another city or country). General regions or specific locations within a region could be tagged as "High risk" (e.g., places where known fraudulent activity has been reported in the past). Similarly, other regions or specific locations could be tagged as "Low risk" (e.g., if no known fraudulent activity has been reported). As yet another example of contextual input for use in meeting the security requirements, user spending behavior deviation 312 may be utilized. This is a time and location based index. If for example, the user engages in more free spending every other Friday (due to receiving a paycheck), this spending behavior would be part of an overall spending pattern, and thus could inform the overall Risk Index. Another pattern might be more frequent spending while in another city during the holidays (e.g., visiting relatives for the holidays). Both of these examples would result in Low Risk since the spending behavior pattern is established in both instances.

As a further example, Crowd sourced data collected during an event 314 may be utilized as contextual input in determining security requirements. If for example an event is being held at a particular time and place (e.g., county fair) and many people are spending at a particular vendor(s) (e.g., entrance fee), this data could inform the overall Risk Index. In this example, the many transactions occurring in one location during the event would result in a Lower Risk level. As another example, Demographic profile data 316 may be utilized as contextual input in determining security requirements. Some features of a demographic profile (e.g., gender, age, ethnicity, income, credit score, identity theft history, etc.) may be used as a global multiplier of the Risk Index for an individual. For example, if an individual is very young or elderly, they may be more open to cases of fraud. In such cases a multiplier could be globally applied to the calculated Risk Index (e.g., Risk Index*1.2). Individuals who have had their identity stolen in the past might also benefit from a slightly raised Risk Index. Other groups may derive the most benefit most from globally lowering the Risk Index score a slight amount (e.g., persons with moderate income level who are between ages 25-55, Risk Index*0.80).

Therefore, a Risk Index can be calculated by using the contextual input parameters, previously described, with reference to table 300 of FIG. 300. As an example, the overall Risk Index might range from 1-10, where 1-3 might be Low Risk, 4-7 might be Medium Risk, and 8-10 might be High Risk. Each contextual input available could be used to calculate the Risk Index. In other implementations, the user could directly set a Risk Index for each selected application or service. In this implementation it would be possible to allow some applications or services to use a dynamic (calculated) Risk Index that depends on the contextual inputs above and for others to use a static setting Risk Index that is applied every time.

As has been described, a Risk Index may be determined based upon the contextual inputs and a Trust Index may be determined based upon the sensor inputs. The security requirement may be determined to be satisfied if the Trust Index is greater than the Risk Index (Trust Index>Risk Index). In this way, an authentication process that satisfies the security requirement is selected from the plurality of multiple authentication processes and the authentication process is executed to allow the mobile device 101 to be authenticated with a service provider and/or application and/or device.

A particular example of calculating a Risk Index based upon contextual inputs utilizing the example of the risk index table 300 will be illustrated. For example, the following contextual variables could be used to weight the Risk Index: If transaction amount is medium (e.g., $150)—Risk Index=Medium (4); and if the location is public—Risk Index is increased to Medium (5); and if user spending behavior deviation is inconsistent with past behavior—Risk Index increased to Medium-High (7); and if crowd source data reports high risk in the user's location—Risk Index increased to High (8); and if user demographics were somewhat high risk the index may be weighted (e.g., multiplied by 1.1). In this example, the overall Risk Index then becomes: Risk Index=8*1.1=8.8. Accordingly, in this example, the overall Risk Index is determined to be: 8.8. In this example, an authentication process that satisfies the security requirement (Trust Index>Risk Index) is selected from the plurality of multiple authentication processes and requires an authentication process with a High Trust Index (e.g., Iris scan, or Fingerprint scan and Voice scan, etc.)

Examples of authentication processes will be hereinafter described. Authentication strategies range from very high security methods, such as iris scanners (with very low False Accepts), to lower security but more convenient and socially acceptable methods, such as finger print scans and hand geometry scans. Thus, a Trust level can be associated with each authentication method based on basic False Accepts and False Rejects for a given enrolled database size. While technical implementations of biometric authentication methods may differ, the human physiological limitations of the uniqueness and consistency of a particular biometric trait do not change in the population at large—some traits are more unique (between people) and consistent (within a person) than other traits, and thus are capable of stronger security.

For example, it is known that irises are so unique that the false accept rate (FAR) is likely 1 in 1.2 million trials, while fingerprints generally result in 1 false accepts in 10,000 trials, similar to a 4 digit PIN. Hand geometry, in contrast, has a FAR of 1:1000 when extracted using standard cameras and methods, while extraction of hand geometry features from a touch screen results in a FAR of much less, given a similar number of trials and database size. Lower security biometrics, in contrast, tend to be less invasive, but more socially accepted and more convenient to use than higher security biometric methods.

As has been previously described, in some embodiments, sensor inputs include biometric sensor inputs from biometric sensors that are utilized to create a Trust Index. For example, as previously described, biometric sensors for biometric sensor inputs may include: heart rate sensor 137, fingerprint sensor 152 (e.g., fingerprint input), touch-screen 120 (e.g., hand geometry), pressure sensors (hand geometry), microphone 165 (e.g., voice scan), camera 170 (facial scan), etc.

Figure 4:
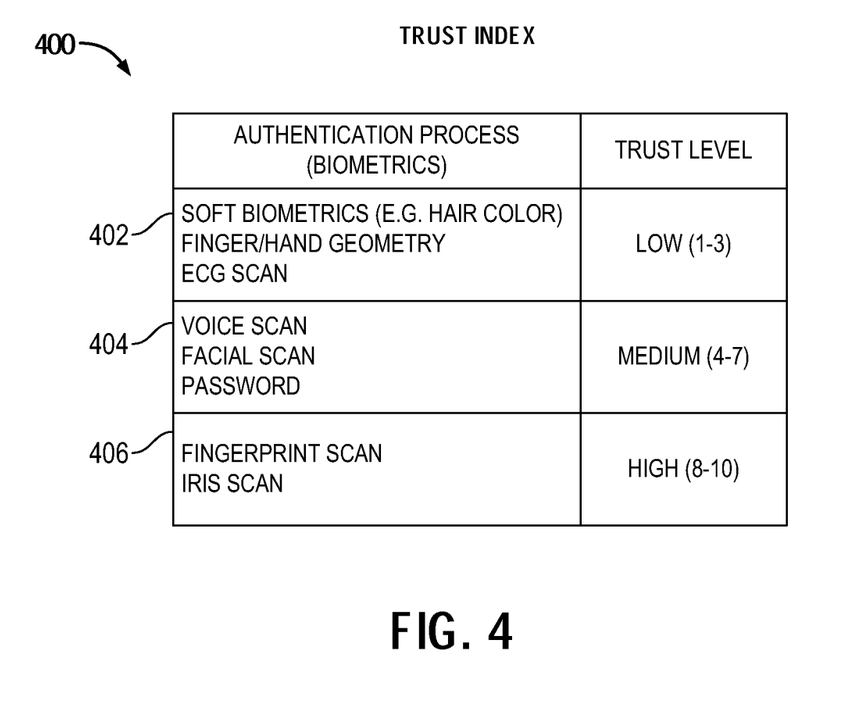
FIG. 4 is table illustrating Trust Indexes.

With additional reference to FIG. 4, A Trust Index 400 can be generated using the following authentication methods that provide example trust levels. As shown in FIG. 4, low trust levels (1-3) may only require low biometric authentication processes 402: soft biometrics (e.g., hair color); fingerprint/hand geometry; ECG scan; etc. Medium trust levels (4-7) may require medium biometric authentication processes 404: voice scan; facial scan; password; etc. On the other hand, high trust levels (8-10) may require high biometric authentication processes 406: fingerprint scan; iris scan; etc.

As previously described, a risk index may be determined based upon the contextual inputs and a trust index may be determined based upon the sensor inputs, and in particular, biometric sensor inputs. The security requirement may be determined to be satisfied if the trust index is greater than the risk index (Trust Index>Risk Index). In this way, an authentication process that satisfies the security requirement is selected from the plurality of multiple authentication processes and the authentication process is executed to allow the mobile device 101 to be authenticated to a service provider and/or application and/or device. As an example, for a particularly high risk bank transaction (e.g., High Risk Index), authentication method(s) that are associated with a high trust level to yield a Trust Index that is at least equal to if not greater than the Risk Index is selected. For example, for a High Risk bank transaction (8-10), the required security level could require a Fingerprint scan process having a High Trust Index level (8-10), such that the Trust Index level exceeds the Risk Index Level. Alternatively, if the mobile device is not capable of a fingerprint scan, a Face scan+ Voice scan, etc., may be utilized to meet the Trust Index Level required.

In some embodiments, when authentication is required, ambient levels of sound, light and motion could be sampled from microphone 165, light sensor 135, and accelerometer 140, respectively, to help select and scale optimal biometric method(s) that yield the most reliable data. For example, if background noise is determined to be too loud to gather voice biometric data, then other authentication methods may be selected (e.g., facial scan, iris scan, fingerprint scan, ECG monitoring, etc.). Further, if a voice scan is gathered by microphone 165, the trust level associated with it may be weighted accordingly (e.g., trust level of a voice scan falls proportional to background noise level). Similarly, if ambient light is too dim to adequately measure facial biometric data (as measured via an ambient light sensor 135) or too bright to measure iris biometric data (causing reflections), then other authentication methods may be selected (e.g., voice scan, fingerprint scan, hand geometry, hand vascular, ECG monitoring, etc.). Further, if a facial scan is gathered, the trust level associated with it may be weighted accordingly (e.g., trust level of a facial scan falls proportional to ambient brightness). In some embodiments, if there is too much movement to gather fingerprint, finger/hand geometry, finger/hand vascular pattern or ECG biometric data, then other authentication methods (e.g., voice scan, facial scan, iris scan) may be gathered. Further, if a fingerprint, for example, is gathered, the trust level associated with it may be weighted accordingly (e.g., trust level of a fingerprint falls proportional to movement).

Further, if key demographic contextual inputs can be inferred or are known (e.g., age), then an authentication process may be selected that optimizes biometric feature reliability. For example, the biometric authentication process for a teenage boy may forego voiceprint authentication, since there may be a higher probability of a cracking or changing voice, or if used could be weighted lower on the Trust Index for this group of users. Another example is fingerprint profiles for elderly users (e.g., >age 75) may be somewhat unreliable, so a fingerprint scan for these users may not be selected, or if it were used it could be weighted potentially lower on the Trust Index for this group.

Figure 5:
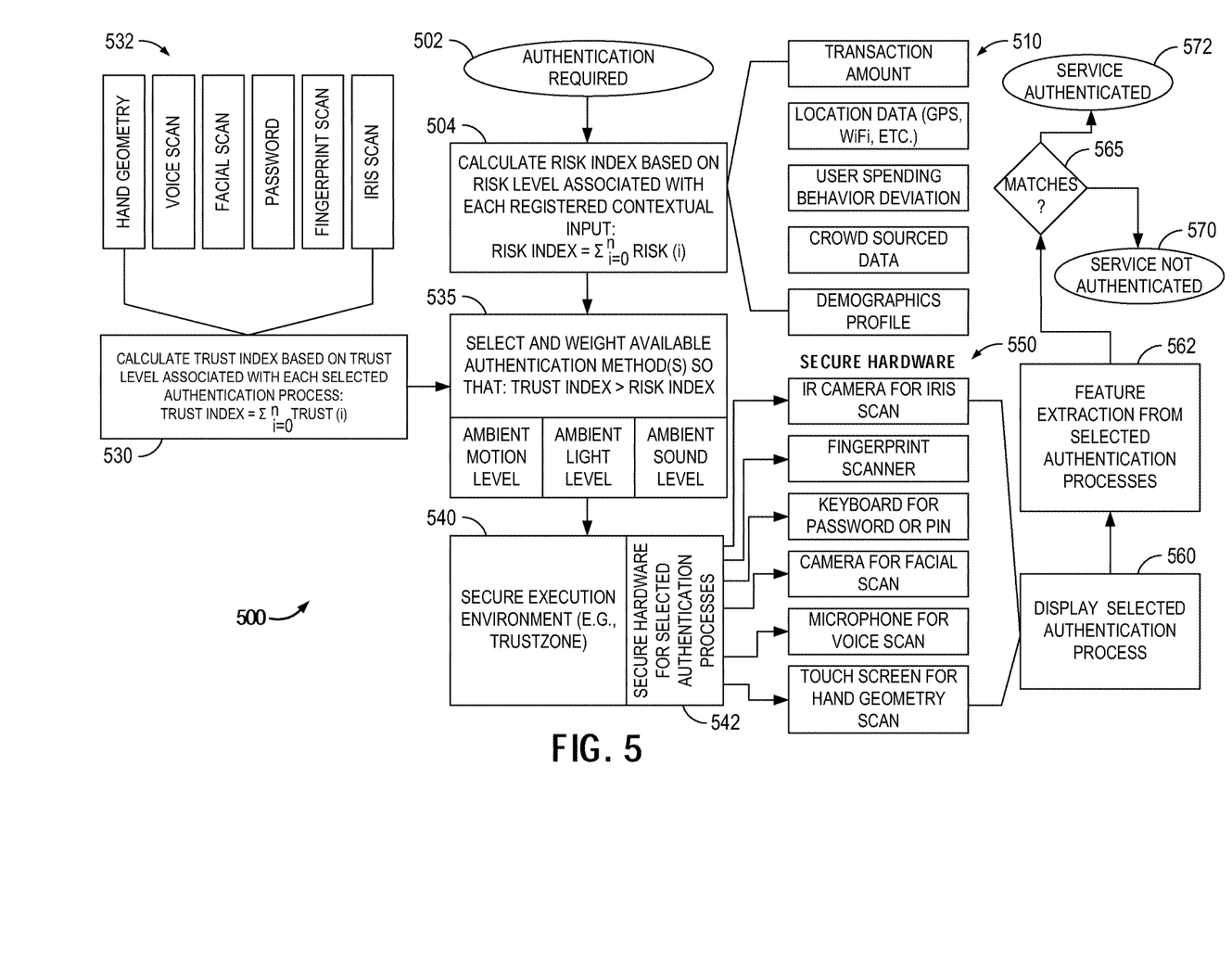
FIG. 5 is a diagram illustrating a process to select an authentication process.

With additional reference to FIG. 5, one embodiment of an authentication process 500 will be described. At step 502, a user accesses a service provider, an application, or a device which requires authentication (block 502). For example, as previously described, a user accesses a bank website to pursue a money transfer. At block 504, a Risk Index is calculated. For example, the Risk Index may be calculated based on a Risk Level associated with each registered Contextual Input in accordance with the Risk Index equation of block 504. Examples of Contextual Inputs 510 include: Transaction amount; Location data (GPS, WiFi, etc.); User spending behavior deviation; Crowd sourced data; Demographic profile. The determination of Risk Indexes based upon Contextual Inputs has been previously described in detail with reference to FIG. 3. Thus, the Risk Index is calculated at the time of authentication based upon the level of risk associated with each of the previously described available Contextual Inputs. It should be appreciated that some contextual inputs/variable may be stored in the mobile device and accessed at a different time.

Further, at block 530, a Trust Index is calculated. For example, the Trust Index may be calculated based upon the Trust Level associated with each of the selected Authentication processes in accordance with the Trust Index equation of block 530. Examples of Authentication processes or methods 532 include: hand geometry; voice scan; facial scan; password; fingerprint scan; iris scan; etc. The determination of Trust Indexes based upon Authentication processes, particularly biometric authentication processes, has been previously described in detail with reference to FIG. 4. Thus, the Trust Index is calculated based upon the level of trust associated with each of the selected authentication processes.

In particular, as shown in block 535, available authentication methods/processes are selected and weighted such that the security requirement: Trust Index>Risk Index is satisfied. In particular, the Trust Index is calculated based upon the level of trust associated with each of the authentication processes available on the mobile device. Examples of these types selections, in which the Trust Index>Risk Index, have been previously described in detail (e.g., Voice Scan+Finger Scan equals a High Trust Index (9) that is greater than a Risk Index of 7). Further, as previously described, ambient motion levels, ambient light levels, and ambient sound levels may be utilized in the selection and weighting of Trust Indexes. With reference to block 540, once the authentication processes are selected, a secure execution environment (e.g., TrustZone) may be implemented by processor 101 of mobile device 100 to secure the necessary hardware components for the authentication processes (block 542). Examples of the these types of secure hardware components 550 include: IR sensor 153/camera 170 for Iris scan; fingerprint sensor 152 for fingerprint scan; user interface/keyboard 116 for password or PIN; camera 170 for facial scan; microphone 165 for voice scan; touchscreen display 120 for hand geometry scan, etc. It should be appreciated, that in some embodiments, higher security methods having high trust levels (e.g., high trust level 406, FIG. 4) may be initially required, and after a predefined time period and/or if the Risk Index based upon contextual inputs has not changed significantly to effect the threshold (e.g., Trust Index>Risk Index), then the user may be allowed to utilize lower security methods having lower trust levels (e.g., low trust level 402, FIG. 4), until the situation (e.g., the context) changes.

At block 560, each of the multiple selected authentication processes may be displayed to the user sequentially or in parallel. Although, only one authentication process may be required. However, it should be appreciated that a "passive" authentication process may be beneficial that does not require any manual input by the user and is therefore the least intrusive. Accordingly, if a trust index is selectable by the mobile device (based upon passive authentication processes) that is greater than the risk index, then a passive authentication process (e.g., hand geometry from the touchscreen) will be selected and manual input is not required by the user and the authentication processes do not need to be displayed. At block 562, the features (e.g., sensor inputs) are extracted from the selected authentication process. At block 565, if the captured features match the enrolled features from a stored template, then the service/application/device is authenticated block 572 and, if not, then the service/application/device is not authenticated block 570.

Also, in some embodiments, the authentication process 500 may include an embodiment in which two or more people are required to perform the authentication process 500 such that the service/application/device is authenticated. As another particular example embodiment, a parent may be required to perform the authentication process 500 on behalf of a minor.

Therefore, in one example, a mobile device 100 may select an authentication process using multiple authentication methods based upon contextual inputs (e.g., transaction amount, location data, user spending behavior data, crowd sourced data, demographic profiles, etc.) and biometric sensor inputs (e.g., hand geometry, voice scan, facial scan, fingerprint scan, iris scan, etc.) In particular, the processor 101 of the mobile device 100 may be configured to: determine multiple authentication processes based upon the contextual inputs, biometric sensor inputs, and the capabilities of the mobile device 100 for authentication with at least one of a service provider/application/device, etc. Further, the processor 101 may be configured to select an authentication process from the multiple authentication methods that satisfies a security requirement, in which the security requirement may be defined as the Trust Index being greater than the Risk Index, as previously described in detail.

In some embodiments, the authentication methods may be user-defined. For example, a user may enroll and use multiple authentication methods that the mobile device is capable of utilizing (e.g., password, facial scan, voice scan, hand geometry, ECG, fingerprint scan, iris scan, etc.) and elect to not enroll others. Also, in some embodiments, if a particular biometric sensor can only extract partial data due to noise (e.g., partial data due to dirt or movement), or partial facial scan due to shadowing, or partial voice scan due to background noise, or partial iris scan due to reflection, squinting or eye movement, then the Trust Index may be calculated based upon only the limited features that can be extracted. A partial scan for example may meet the security requirements (Trust Index>Risk Index) to authenticate a low-security application (e.g., view photos). However, extracting only a partial scan may not meet the security needs of higher security applications (i.e., Trust Index<Risk Index) and additional authentication may be required. Although PIN or password authentication may be a requirement for an online financial service or mobile service, this may serve as the minimum level of required security. Contextual inputs may bump up a calculated Risk Index such that it exceeds the trust level associated with the online PIN or password, requiring additional biometric authentication methods to meet the Risk Index score.

It should be appreciated that aspects of the invention previously described may be implemented in conjunction with the execution of instructions by processors of the device, as previously described. Particularly, circuitry of the devices, including but not limited to processors, may operate under the control of a program, routine, or the execution of instructions to execute methods or processes in accordance with embodiments of the invention. For example, such a program may be implemented in firmware or software (e.g. stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, an entertainment device (e.g., a music or video device), a headset (e.g., headphones, an earpiece, etc.), a medical device (e.g., a heart rate monitor, a pedometer, an EKG device, etc.), a user I/O device, a computer, a wired computer, a fixed computer, a desktop computer, a server, a point-of-sale device, a set-top box, or any other suitable device. These devices may have different power and data requirements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile device comprising:
    a plurality of sensors; and
    a processor configured to:
        determine multiple authentication processes based upon one or more sensor inputs and mobile device capabilities for authentication with at least one of an application or a service provider;
        select an authentication process including the one or more sensor inputs from the multiple authentication processes that satisfies a security requirement in which a trust index calculated as a summation of values of each of the one or more sensor inputs is greater than a risk index calculated as a summation of values of one or more contextual inputs including user data and environmental data, wherein the authentication process is selected or not selected based on at least one of measured ambient levels of sound, light, or motion used to weight the value of the one or more sensor inputs; and
        execute the selected authentication process.

2. The mobile device of claim 1, wherein, the processor is further configured to determine the risk index based upon contextual inputs including at least one of demographic data, transaction data, or location data.

3. The mobile device of claim 2, wherein, the processor is further configured to determine the trust index based upon the sensor inputs including at least one of a voice scan, a facial scan, or a fingerprint scan.

4. The mobile device of claim 1, wherein, authentication processes are user-defined.

5. A method comprising:
determining multiple authentication processes based upon one or more sensor inputs and mobile device capabilities for authentication with at least one of an application or a service provider;
selecting an authentication process including the one or more sensor inputs from the multiple authentication processes that satisfies a security requirement in which a trust index calculated as a summation of values of each of the one or more sensor inputs is greater than a risk index calculated as a summation of values of one or more contextual inputs including user data and environmental data, wherein the authentication process is selected or not selected based on at least one of measured ambient levels of sound, light, or motion used to weight the value of the one or more sensor inputs; and
executing the selected authentication process.

6. The method of claim 5, further comprising determining the risk index based upon contextual inputs including at least one of demographic data, transaction data, or location data.

7. The method of claim 6, further comprising determining the trust index based upon the sensor inputs including at least one of a voice scan, a facial scan, or a fingerprint scan.

8. The method of claim 5, wherein, authentication processes are user-defined.

9. A non-transitory computer-readable medium including code that, when executed by a processor, causes the processor to:
determine multiple authentication processes based upon one or more sensor inputs and mobile device capabilities for authentication with at least one of an application or a service provider;
select an authentication process including the one or more sensor inputs from the multiple authentication processes that satisfies a security requirement in which a trust index calculated as a summation of values of each of the one or more sensor inputs is greater than a risk index calculated as a summation of values of one or more contextual inputs including user data and environmental data, wherein the authentication process is selected or not selected based on at least one of measured ambient levels of sound, light, or motion used to weight the value of the one or more sensor inputs; and
execute the selected authentication process.

10. The computer-readable medium of claim 9, further comprising code for determining the risk index based upon contextual inputs including at least one of demographic data, transaction data, or location data.

11. The computer-readable medium of claim 10, further comprising code for determining the trust index based upon the sensor inputs including at least one of a voice scan, a facial scan, or a fingerprint scan.

12. The computer-readable medium of claim 9, further comprising code for allowing user-defined authentication processes.

13. A mobile device comprising:
means for determining multiple authentication processes based upon one or more sensor inputs and mobile device capabilities for authentication with at least one of an application or a service provider;
means for selecting an authentication process including the one or more sensor inputs from the multiple authentication processes that satisfies a security requirement in which a trust index calculated as a summation of values of each of the one or more sensor inputs is greater than a risk index calculated as a summation of values of one or more contextual inputs including user data and environmental data, wherein the authentication process is selected or not selected based on at least one of measured ambient levels of sound, light, or motion used to weight the value of the one or more sensor inputs; and
means for executing the selected authentication process.

14. The mobile device of claim 13, further comprising means for determining the risk index based upon contextual inputs including at least one of demographic data, transaction data, or location data.

15. The mobile device of claim 14, further comprising means for determining the trust index based upon the sensor inputs including at least one of a voice scan, a facial scan, or a fingerprint scan.

16. The mobile device of claim 13, further comprising means for allowing user-defined authentication processes.

* * * * *